Figure 1:
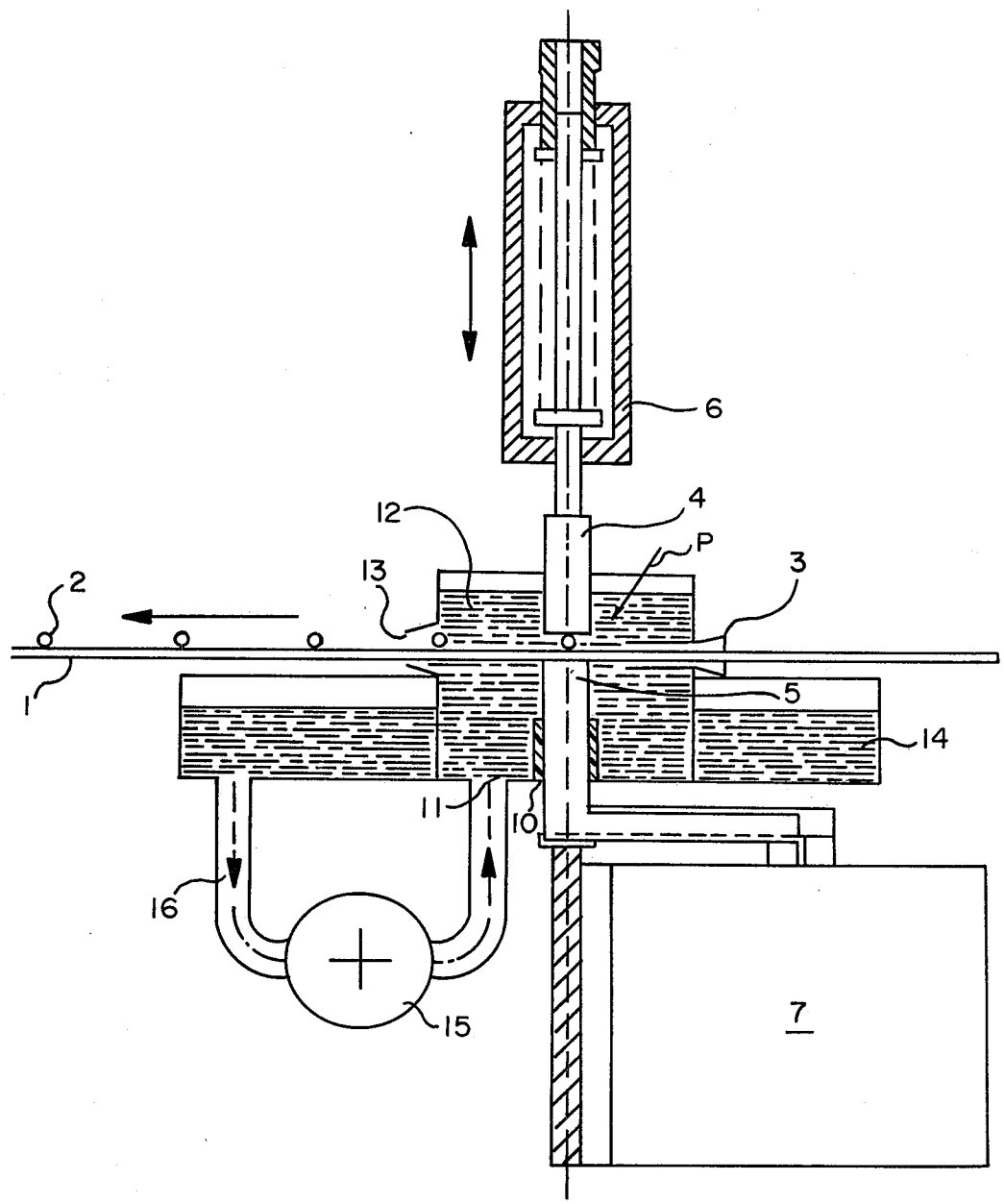

United States Patent [19]

Schmidt et al.

[11] 4,439,658
[45] Mar. 27, 1984

[54] APPARATUS FOR PRODUCING WELDED WIRE GRIDS

[75] Inventors: Gerhard Schmidt; Klaus Ritter; Gerhard Ritter; Hans Gött; Josef Ritter, all of Graz, Austria

[73] Assignee: EVG Entwicklungs-und Verwertungs Gesellschaft m.b.H., Graz, Austria

[21] Appl. No.: 310,417

[22] Filed: Oct. 9, 1981

Related U.S. Application Data

[62] Division of Ser. No. 166,299, Jul. 7, 1980, abandoned.

[51] Int. Cl.³ .............................................. B23K 11/32
[52] U.S. Cl. ...................................... 219/56; 219/72; 219/89; 219/120
[58] Field of Search ...................... 219/72, 120, 56, 89

[56] References Cited

U.S. PATENT DOCUMENTS

| 2,001,688 | 5/1935 | Paugh | 219/120 |
| 2,841,689 | 7/1958 | Pappelendam | 219/120 X |
| 3,017,494 | 1/1962 | Mackey | 219/72 X |
| 3,463,895 | 8/1969 | Senn | 219/89 X |

FOREIGN PATENT DOCUMENTS 65888 2/1914 Fed. Rep. of Germany ........ 219/72

*Primary Examiner*—Elliot A. Goldberg
*Attorney, Agent, or Firm*—Ernest F. Marmorek

[57] ABSTRACT

The disclosure relates to the production by means of an electrical resistance welding method, of grids formed from metal wires crossing over another. The grid wires are carried through between rows of cooperating electrodes and, under pressure, are welded together at the cross points of the wires by an electric current. Each cross point of the wires and the surfaces of the associated electrodes of the grid welding machine, which lie in the welding region, are subjected to the action of a liquid coolant to increase the life of the electrodes and reduce distortion of the grid due to the localized heating of the wires.

2 Claims, 2 Drawing Figures

APPARATUS FOR PRODUCING WELDED WIRE GRIDS

This is a division of application Ser. No. 166,299, filed on July 7, 1980, now abandoned.

The invention relates to an electrical resistance welding method, for producing welded grids from metal wires crossing one another, in which the grid wires are fed between rows of cooperating electrodes and are welded together under pressure at the points where the wires cross.

The combined effect of the heat and pressure for the welding process is to cause rapid wear of the electrodes, so that these must be frequently exchanged or reground to ensure satisfactory welds. For increasing the working life of the electrodes they may be cooled by means of a coolant flowing through coolant circulation ducts built into the mountings of the electrodes (cf. Swiss Pat. No. 390,405). However, particularly in the production of narrow-mesh grids where electrodes of small cross-section must be used and which allow of only narrow internal coolant circulation ducts, there are problems in making the cooling sufficiently effective to achieve an adequate working life for the electrodes.

A further disadvantage which arises in this type of welding and which has not previously been solved satisfactorily in practice is that the heating necessary for the welding causes the grid to buckle. This happens despite careful straightening of the wires before the welding process because the local and one-sided heating of the grid wires during the welding process leads to buckling of the grid wires and thereby to warping of the grid upon cooling down. These phenomena occur particularly strongly in the case of narrow-mesh grids and also in the case of grids having wires welded deeply into one another where the amount of heat supplied relative to the heated mass of wire is particularly large.

An object of the invention is to specify a method for the production of welded grids according to the electrical resistance welding method, by means of which the difficulties described above are eliminated so that the working life of the electrodes adopts a multiple of the value hitherto and welded grids are obtained without any substantial warping after the welding process.

In accordance with the invention in an electrical resistance welding method, for producing welded grids from longitudinal and transverse metal wires crossing one another, wherein said wires are fed between rows of paired cooperating electrodes and are welded together, under pressure at the points where said wires cross, by means of an electric current, the improvement comprises subjecting said cross points of said wires and said associated electrodes to the action of a liquid coolant.

The liquid coolant should exhibit an adequately high specific electric resistance in order to avoid disturbing leakage between the electrodes. But tests have proved that this demand may easily be fulfilled and in particular is fulfilled even by normal water from the mains.

The action of the liquid coolant may be effected by the wires to be welded being led through a bath of liquid and being welded together under the surface of the liquid. In a variant of the method a stream of liquid is directed onto each cross point of the wires and onto the surfaces of the associated electrodes.

The application of the method in accordance with the invention offers a particular advantage in the case of the production of welded grids from galvanized steel wires because the zinc or respectively zinc oxide vapours which arise in the case of the welding of galvanized wires become condensed in the liquid coolant and precipitated, in which case they remain in the coolant so that air pollution and annoyance of the workshop personnel are avoided. Filters for the removal of the suspended particles may be inserted in the coolant circuit.

The invention also includes apparatus for carrying out the method, the apparatus comprising a catcher tank for said liquid coolant, said tank being open at the top, and having sidewalls and an upper boundary formed by upper edges of said sidewalls; guides for guiding said longitudinal wires of said grid through said apparatus, said guides being positioned above said upper boundary of said tank; a pump for conveying said liquid coolant from said catcher tank up to said electrodes and said cross points lying above said catcher tank.

Figure 2:
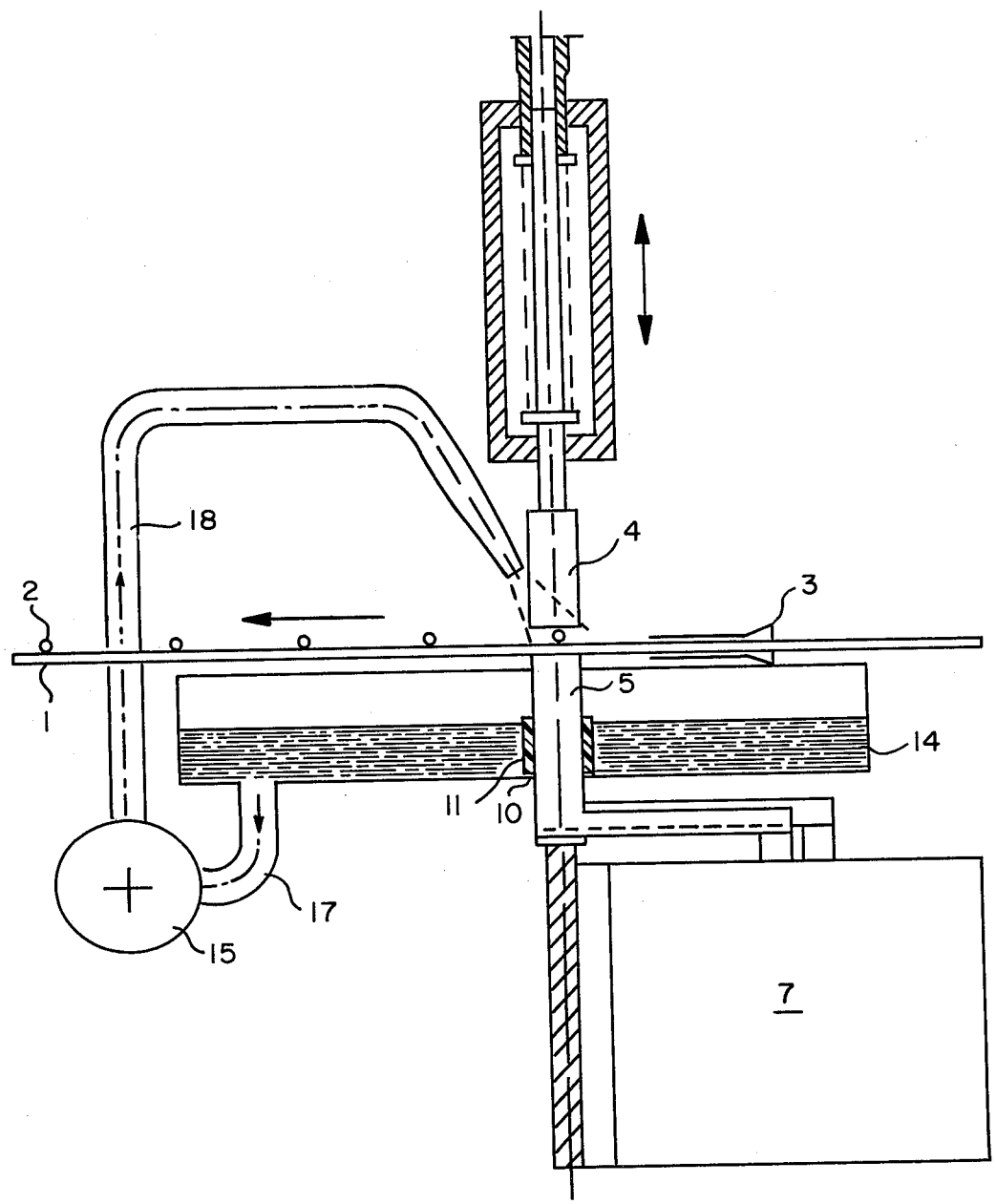

Two examples of apparatus for carrying out the method of the invention will now be described with reference to the accompanying drawings in which:

FIG. 1 is a diagrammatic section through apparatus in which the wires to be welded are drawn through a water bath; and FIG. 2 is a similar section through a device in which each cross-point of the wires is subjected to a stream of water.

In FIG. 1 may be seen a set of longitudinal wires 1 and cross-wires 2 of a welded grid. The longitudinal wires 1 are led through guides 3 into the welding region which lies at the same height as these guides and between upper and lower electrodes 4 and 5 respectively associated with one another in pairs. In known manner the upper electrodes 4 are spring loaded and guided to be able to slide in an electrode beam 6 which can be moved up and down. The lower electrodes 5 are stationary.

The lower electrodes 5 are connected in known manner, e.g. alternately, to one of the two connections to the secondary leads of a transformer 7. The upper electrodes 4 are then connected together conductively in pairs and form passive current bridges. The stationary lower electrodes 5 project through pipe stubs 11 sealed by a sealing and insulating compound 10 into a cooling tank 12 containing a cooling liquid.

The longitudinal wires 1 enter the cooling tank 12 through the guides 3, and the welded grid leaves through an outlet slit 13. The tank 12 is further provided with an opening in the side (which cannot be seen in FIG. 1) for the feeding in of the crosswires to the welding region lying in the cooling tank 12 between the electrodes 4 and 5. Under certain circumstances and in some machines the crosswires 2 may also be brought against the longitudinal wires 1 from above in the direction of the arrow P.

In order to be able to keep the welding region in the cooling tank 12 permanently flooded and to achieve a relatively small consumption of liquid, a catcher tank 14 is provided, preferably surrounding the cooling tank 12 on all sides, to collect the liquid, preferably water, coming out through the different openings for the wires or the completed grid.

A pump 15, the delivery rate of which must be greater than the rate at which the liquid comes out of the different openings in the cooling tank 12 in order to be able to bring the level of liquid in the cooling tank 12 up to any height required, is located in a pipe 16 connecting the catcher tank 14 to the cooling tank 12 and pumps the liquid from the catcher tank 14, continuously back into the cooling tank 12 again to keep the level of liquid in the latter permanently at the same height above the guides 3 and the outlet slit 13 and hence also above the welding region. The welding process is then effected in known manner but permanently underneath the surface of the liquid in the tank 12.

In the way described not only is an extremely effective and simple cooling achieved of the surface regions of the electrodes subjected to the greatest heat, but also, complicated, narrow and hence significantly less effective, coolant circulation ducts in the electrodes holders become superfluous. Since the grid itself is also cooled very effectively directly at the points of weld, the heating of the grid wires is limited to the direct zone of contact between connected wires and conduction of the heat along the wires and hence a more or less intense heating up of the whole grid is avoided. The working life of the electrodes is on the one hand considerably prolonged thereby and on the other hand warping of the grid is avoided.

The apparatus shown in FIG. 2 differs from that of FIG. 1 merely in that for the cooling liquid only a catcher tank 14 is provided into which the lower electrodes 5 again project through pipe stubs 11. The pump 15 takes liquid from the catcher tank 14 through a suction pipe 17 and forces it into a system of pressure pipes 18. Individual pressure pipes 18, if necessary having a ring nozzle, are associated with each pair of cooperating welding electrodes 4, 5. In this way the electrodes and the points of weld lying at any time between two associated electrodes may be flushed over and cooled by a stream of liquid. Obviously, cooling devices may be inserted in the circulation path of the liquid coolant if so desired.

We claim:

1. Apparatus for use in an electrical resistance welding method for producing welded grids from longitudinal and transverse metal wires crossing one another, wherein said wires are fed between rows of paired cooperating electrodes and are welded together under pressure at the points where said wires cross by means of an electrical current, and in which the resulting cross points of said wires and said associated electrodes are subjected to the action of a liquid coolant, comprising in combination first and second tanks, each having sidewalls and an upper boundary formed by upper edges of respective of said sidewalls, said first tank being a catcher tank for said liquid coolant and being open at the top;

guides for guiding said longitudinal wires of said grid through said apparatus, said guides being positioned above said upper boundary of said catcher tank, said upper boundary of said second tank lying above said guides for said longitudinal wires, said sidewalls of said second tank having openings for receiving said guides and an outlet slit for said welded grid;

a pump for conveying said liquid coolant from said catcher tank up to said electrodes, said cross points lying above said catcher tank, and a pipe connecting said second tank and said pump for conveying said liquid coolant from said catcher tank to said second tank.

2. Apparatus according to claim 1, wherein said sidewalls of said second tank include an opening for feeding individual ones of said transverse wires into said second tank to said longitudinal wires.

* * * * *